US011157880B2

(12) United States Patent
Bender et al.

(10) Patent No.: US 11,157,880 B2
(45) Date of Patent: Oct. 26, 2021

(54) ENFORCEMENT OF SERVICES AGREEMENT AND MANAGEMENT OF EMOTIONAL STATE

(71) Applicant: International Business Machines Corporation, Armonk, NY (US)

(72) Inventors: Michael Bender, Rye Brook, NY (US); Edward T. Childress, Austin, TX (US); Rhonda L. Childress, Austin, TX (US); Donald L. Muchmore, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 15/401,973

(22) Filed: Jan. 9, 2017

(65) Prior Publication Data

US 2018/0197150 A1 Jul. 12, 2018

(51) Int. Cl.
*G06Q 10/10* (2012.01)
(52) U.S. Cl.
CPC .............................. *G06Q 10/1095* (2013.01)
(58) Field of Classification Search
CPC .................................................. G06Q 10/1095
See application file for complete search history.

(56) References Cited

U.S. PATENT DOCUMENTS

| 9,026,941 | B1 | 5/2015 | Krueger et al. | |
|---|---|---|---|---|
| 2008/0221401 | A1* | 9/2008 | Derchak | A61B 5/16 600/301 |
| 2014/0244555 | A1* | 8/2014 | Kane-Esrig | A61B 5/165 706/12 |
| 2014/0366049 | A1* | 12/2014 | Lehtiniemi | H04N 21/44218 725/12 |
| 2015/0187038 | A1 | 7/2015 | Johnson et al. | |
| 2016/0302711 | A1* | 10/2016 | Frank | A61B 5/165 |
| 2017/0071551 | A1* | 3/2017 | Jain | A61B 5/0006 |

FOREIGN PATENT DOCUMENTS

WO    WO2014145228 A1    9/2014

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

* cited by examiner

*Primary Examiner* — Sujay Koneru
*Assistant Examiner* — Mohamed N El-Bathy
(74) *Attorney, Agent, or Firm* — Heslin Rothenberg Farley & Mesiti P.C.; Michael A. Petrocelli, Esq.

(57) ABSTRACT

A method, computer program product, and system includes a processor(s) configuring a sensor(s) (first sensor(s)), to capture data related to an emotional state of an individual and a sensor(s) (second sensor(s)), to capture data related to an environment of the individual. The processor(s) obtains, over a pre-defined period of time, data from the sensors and utilizes data from the second sensor(s) to identify activities in which the individual participated. The processor(s) obtains, from a scheduling resource, a schedule of activities scheduled for the individual. The processor(s) generates a record for each activity. The processor(s) determines, based on data from the first sensor(s) and the record for each activity, emotional states of the individual throughout each activity of the identified activities. The processor(s) generates a rule representing relationships between events during each activity and emotional state of the participant and recommends a schedule of future activities.

19 Claims, 6 Drawing Sheets

310

ACTIVITY: 1 hour grooming

GROOMER(S): Bill

SERVICES PERFORMED: bath, brushing, blow dry, nail trim, ear cleaning, sanitary trim, paw trim, and body contour TIME: 1pm – 2:05pm, October 3

320

ACTIVITY: 1 hour grooming

GROOMER(S): Heidi

SERVICES INCLUDED: bath, brushing, blow dry, nail trim, ear cleaning, sanitary trim, and paw trim SCHEDULED TIME: 1pm – 2pm, October 3

PRICE: $45.00

330

ACTIVITY: 1 hour grooming

GROOMER(S): Bill

SERVICES PERFORMED: bath, brushing, blow dry, nail trim, ear cleaning, sanitary trim, paw trim, and body contour TIME: 1pm – 2:05pm, October 3

PRICE: $45.00

FIG. 3

ENFORCEMENT OF SERVICES AGREEMENT AND MANAGEMENT OF EMOTIONAL STATE

BACKGROUND

Senior citizens, young children, and pets are frequently brought to facilities to provide services to them. The care facilities can include both full-time care and day care. The regular care givers of senior citizens, children, and pets, opt to acquire services for those in their charge at these types of facilities because of the level of care that the facilities provide, as well as the level of detail that the facility employees can offer the care givers about the experiences of the charges while receiving the care, demonstrate, to the care givers, that their charges are receiving proper care and are in good spirits. In general, when a service is purchased by a first person for another person or for a pet, the individual who purchased the service wants assurances both that the purchased services were properly provided and that the person or pet for whom the service was purchased was treated appropriately.

SUMMARY

Shortcomings of the prior art are overcome and additional advantages are provided through the provision of a method for maintaining an emotional state of a participant when scheduling activities. The method includes, for instance: configuring, by one or more processors, a first one or more sensors, to capture data related to an emotional state of the individual; configuring, by one or more processors, a second one or more sensors, to capture data related to an environment of the individual; obtaining, by the one or more processors, over a pre-defined period of time, over a wireless communications connection, the data from the first one or more sensors and the data from the second one or more sensors, wherein the data from the first one or more sensors and the data from the second one or more sensors comprise an identity of the individual; utilizing, by the one or more processors, the data from the second one or more sensors to identify one or more activities in which the individual participated during the pre-defined period of time; obtaining, by the one or more processors, from a scheduling resource, over the wireless communications connection, a schedule indicating the one or more activities scheduled for the individual during the predefined period of time; generating, by the one or more processors, a record for each activity performed during the predefined period of time, based on comparing the identified one or more activities with the scheduled one or more activities, the identified one or more activities, and the scheduled one or more activities; determining, by the one or more processors, based on data from the first one or more sensors and the record for each activity, one or more emotional states of the individual throughout each activity of the identified activities; generating, by the one or more processors, based on the one or more emotional states of the individual throughout each activity of the identified activities, for each activity, a rule representing relationships between events during the activity and an emotional state of the participant; and based on the rules for the identified activities, generating, by the one or more processors, a recommended schedule of one or more future activities, wherein the recommended schedule maintains a threshold emotional state for the individual.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 is an illustration of certain aspects of an embodiment of the present invention;

DETAILED DESCRIPTION

Figure 1:
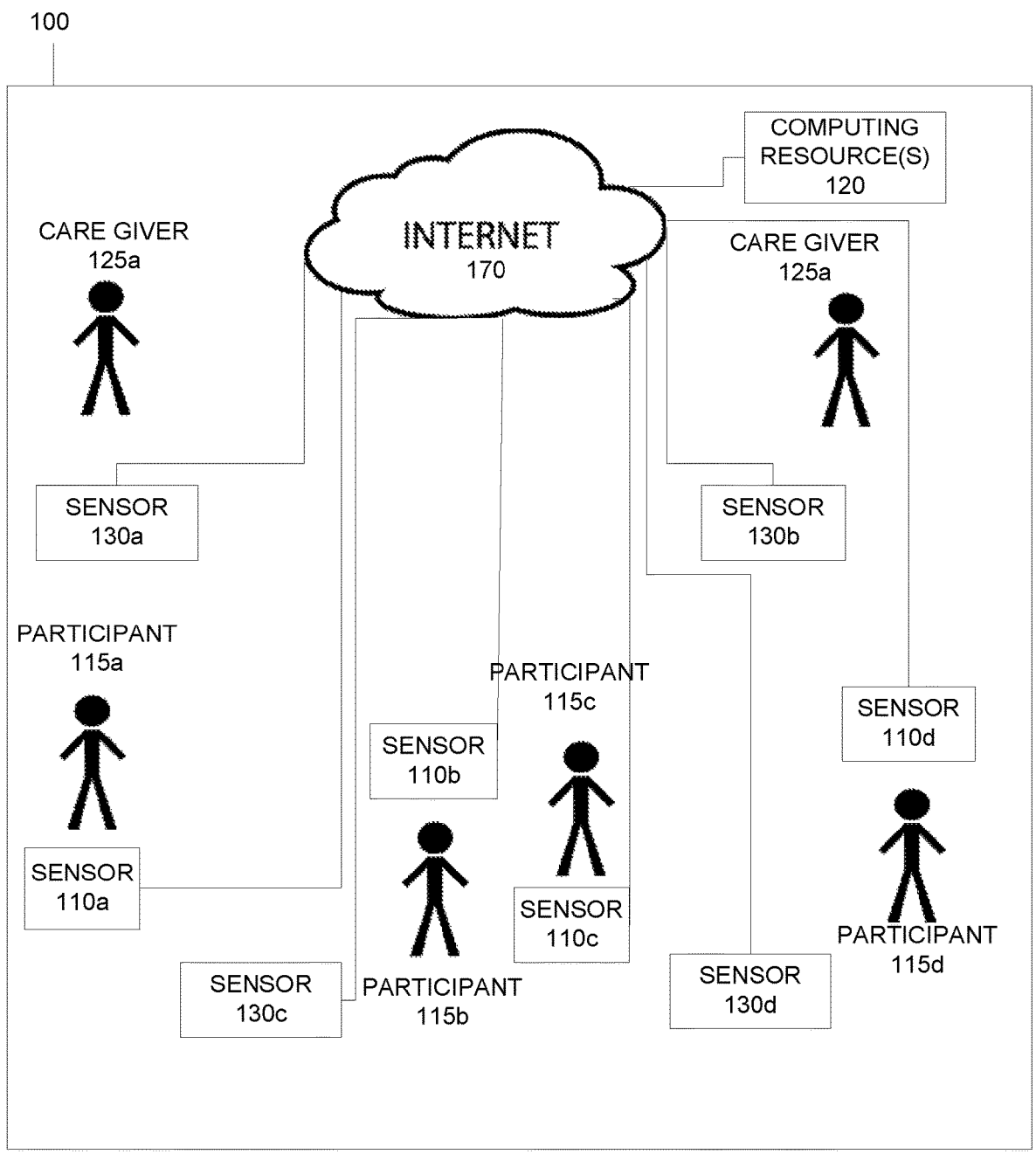
FIG. 1 is a physical environment illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
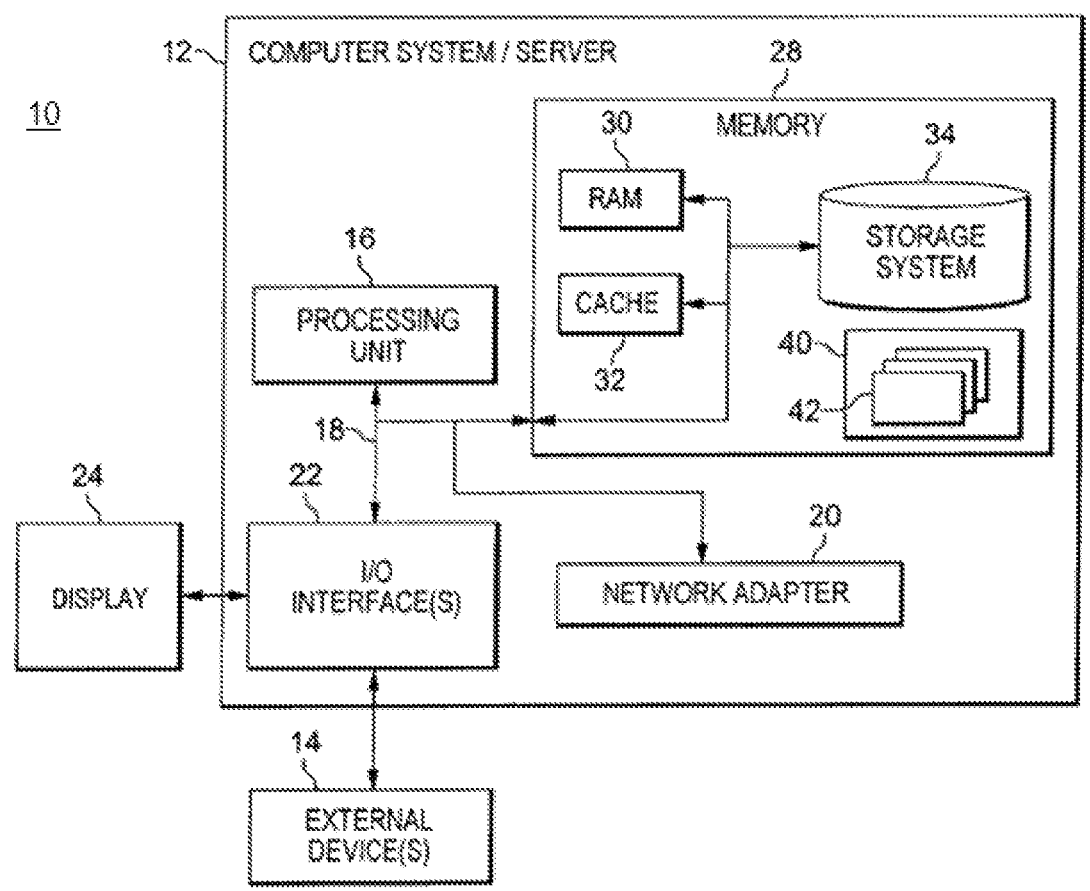
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention provide a computer-implemented method, system, and computer program product for validating the care services and/or activities provided to a recipient and/or a participant (e.g., user, child, elderly person, pet, etc.) and recommending an optimal schedule (e.g., routine, activity) to the recipient and/or caregiver based on the emotional state of the recipient. To this end, embodiments of the present invention include one or more programs executing on at least one processing circuit that utilize sensors to determine an emotional state metric of a care service recipient. The one or more programs validate the service(s) provided to the recipient, based on changes in the emotional state (e.g., happiness/contentment)

of the recipient. Additionally, in embodiments of the present invention, one or more programs recommend an optimal schedule to a recipient, based on a recipient's emotional state metrics, in order to increase/improve the emotional state/wellbeing of the recipient. In certain embodiments of the present invention, one or more programs automatically implement the recommended changes to the schedule of the recipient.

Certain aspects of embodiments of the present invention provide advantages over existing care giving enhancement technologies. For example, one or more programs in embodiments of the present invention not only analyze the mental state of a recipient based on the recipient having participated in an activity (e.g., received a service, participated in a program, etc.), but also monitors changes in state of the activity itself to determined learn how the state is changed by dimensional influences. Thus, in embodiments of the present invention, one or more programs identify activities and determine impacts of the dimensional aspects of the activities that influence the participant. The flexibility of certain embodiments of the present invention enable its efficacy for both human and animal participants in activities and/or receiving a wide variety of services. For example, one or more programs in an embodiment of the present invention can determine that a dog enjoys going on walks with one care giver, but not with another. One or more programs may also determine that an enjoyment of attending concerts varies depending upon the music genre, but also upon the time of day. Embodiments of the present invention integrate this analysis with a committed service plan and ensure that the tasks that comprise the plan are being completed. Thus, in embodiments of the present invention, one or more programs verify the execution of specific tasks(s) at defined service levels, including for defined durations of time. By integrating determinations of emotional state related to dimensional influences within an activity with auditing of the activity (e.g., verification of a service), one or more programs enable activity providers to commit to a certain level of satisfaction (e.g., enjoyment of the participant) and also ensure that individuals involved in administering the activity are performing in a manner that maintains this level or that the factors required to change the activity in a manner that would bring the satisfaction of the participant to the level are known. Another advantage of certain embodiments of the present invention is that the embodiments are applicable across many environments, including environments that are not highly controlled, like a hospital. These embodiments are also not dependent on a specific workflow of the activity, nor tied to increased participation.

Rather than strive for a maximum level of satisfaction, which is not always the most efficient (or realistic), embodiments of the present invention enable providers to provider activities at or above a threshold. To adhere to this goal, one or more programs in an embodiment of the present invention cognitively learns how supplemental factors influence a participant during an activity and utilizes this information when generating a schedule for the activity. An advantage of embodiments of the present invention is that they include one or more programs that recommend and/or automatically implement a schedule based on a human or animal state. Embodiments of the present invention are sensitive to state changes such that although a given activity may not be pleasant (e.g., an intrusive medical procedure), in an embodiment of the present invention, the one or more programs can determine the best achievable state for the participant and the reason that state is achieved. For example, the one or more programs may determine that an unpleasant activity is more pleasant if a given care giver participates. By using sensors and other environmental analysis tools, one or more programs in embodiments of the present invention can optimize the experience for a participant who is unable to communicate his or her state during the activity directly. The participant in these cases may be a child, a pet, or an individual who is unable to communicate based on being differently abled. Thu, in the absence of direct feedback, embodiments of the present invention learns the combination of events and circumstances that change a recipient's mood while validating that paid for tasks (e.g., a customer pays more for a pet to receive premium cat food) are actually performed.

In monitoring individuals and activities for the purpose of scheduling future activities at a certain satisfaction threshold, embodiments of the present invention may utilize different types of sensors that are interconnected as part of the Internet of Things (IoT). By utilizing data gathered by the sensors, one or more programs in embodiments of the present invention: 1) measure mental state of participants in activities; 2) utilize changes in mood metrics to recommend and/or automatically schedule activities based on estimated optimization of mental state in creating this schedule; 3) optimizes the satisfaction level of interactions of a participant, whether a human or an animal when engaged in activities, even when the activity is predicted to degrade the mood of the participant; and 4) enable a provider to provide an activity to a participant at or above a threshold level, as opposed to at a maximum satisfaction level.

Embodiments of the present invention utilize aspects of Internet of Things (IoT) and smart sensors within this network to develop and implement a more efficient approach to validating the care services and/or activities provided to a recipient and/or a participant and recommending an optimal schedule to the recipient and/or caregiver, based on the emotional state of the recipient. As understood by one of skill in the art, the IoT is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to the object, including but not limited to, temperature and humidity. The smart sensors can be utilized to measure temperature, humidity, vibrations, motion, light, pressure and/or altitude. Because the smart sensors carry unique identifiers, a computing system that communicates with a given sensor can identify where the source of the information.

As understood by one of skill in the art, certain types of smart sensors that can communicate in the IoT are utilized to capture the emotional state of individuals within a proximity of these smart sensors. These emotional state sensors include, but are not limited to, sensors that are physically coupled to individuals to capture biometric information indicative of emotional state, voice recognition sensors that track the mood of an individual, and proximity sensors that track movement of individuals that can be equated with emotional responses to environmental stimuli. The emotional state sensors and the smart sensors that monitor environmental changes can work together to recognize the emotional state as the smart sensor can register a change in environmental conditions, while the emotional state sensor captures the reaction of an individual to this change.

Embodiments of the present invention are directed to implementing certain improvements to technologies considered part of the IoT, in order to provide a solution to optimizing and verifying participation in scheduled activities in a predictably efficient manner. This solution is enabled specifically by the utilization of the technology, including but not limited to, smart sensors, personal computing devices, and connectivity and communication of these objects over a wireless communication connection, including but not limited to, the Internet. In one aspect of an embodiment of the present invention, one or more programs receive sensor data from various identifiable objects and utilize the data to determine not only the emotional state of a given participant in activity, but also the state changes of the activity and specific of the activity implementation. An advantage of aspects of embodiments of the present invention is that it provides a method, computer program product, and system for extending functionality in the IoT to provide activities at an established threshold level. This advantage is inextricably tied to computing at least because this aspect improves the efficiency of customer service by implementing specific computing nodes to ensure activities scheduled for a given participant are reliably predicted to meet certain thresholds. By utilizing data collected by customized and strategically placed sensors, as well as communications between computing devices over a communications network, such as the Internet, embodiments of the present invention enable process efficiencies that were formerly not possible. Thus, embodiments of the present invention use of IoT sensors to gather data, verify activity implementation, and recommends or schedule future activities to manage resources and improve consistency in activity implementation.

FIG. 1 is an example of a physical environment 100 where aspects of an embodiment of the present invention have been implemented. Although the utilization of the present invention is not necessarily confined to a geographic area, as the sensors can be carried by individuals rather than being distributed in locations in an environment 100, FIG. 1 confines utilization of the present invention to a physical area for ease of understanding.

As seen in FIG. 1, the environment includes one or more emotional state sensors 110a-110d (this amount is used as a non-limiting example). As understood by one of skill in the art, one or more programs executed on at least one processing circuit have configured these emotional state sensors 110a-110d to produce one or more metrics that represent a real time emotional state of a monitored individual (participant). Depending upon the type of emotional state sensor 110a-110d utilized, these sensors can be located in a place where they are in physical contact with participants 115a-115d in an activity, or within a vicinity of these participants 115a-115d, where the emotional state sensors 110a-110d can produce one or more metrics that represent a real time emotional state. In certain embodiments of the present invention, the emotional state sensors 110a-110d themselves determine the one or more metrics and communicate these metrics, for example, over a wireless network, including but not limited to, the Internet 170. In other embodiments of the present invention, these emotional state sensors 110a-110d are active sensors that are polled by one or more computing resources 120a-120n for data, which one or more programs executed in the one or more computing resources 120a-120n utilize to determine the metric(s). In an embodiment of the present invention, the one or more programs, either executing on the emotional state sensor 110a-110d themselves or on the one or more computing resources 120a-120n, track the metric over time, to create an historical record for each participant to generate a range of emotional states for the participant. Based on the historical metrics, one or more programs calculate an upper bound, lower bound, mean, and standard deviation for a given participant. The one or more programs may retain the historical metrics on one or more memories (not pictured), accessible to the computing resource(s) 120a-120n.

Within the environment 100 are a set of situational sensors 130a-130d (this amount of sensors is used as a non-limiting example) that monitor and/or capture conditions in the environment 100. In an embodiment of the present invention, one or more programs executed on at least one processing circuit configure these sensors to track ambient activity. In an embodiment of the present invention, one or more programs can poll these situational sensors 130a-130d for data to determine environmental conditions within the ranges of these sensors 130a-130d. These sensors 130a-130d can be physically separate entities, or can be integrated, as software and/or hardware, executing on personal computing devices, utilized by individuals within the environment 100. In an embodiment of the present invention, emotional state sensors 110a-110d and situational sensors 130a-130d may comprise the same physical device.

In an embodiment of the present invention, the situational sensors 130a-130d provide data regarding what is happening in the environment 100, including but not limited to, identifying who is within the environment 100, what activities a participant 115a-115d is engaging in, the roles of the care givers 125a-125b, who can be monitored by the situational sensors 130a-130d, in administering the activities, the temperature, the humidity, vibrations, motion, light, the pressure, noise (e.g., what type of music, if any, is being played) and/or altitude.

In an embodiment of the present invention, the one or more programs, either executing on the situational sensors 130a-130d themselves or on the one or more computing resources 120a-120n, track activities over time and create an historical record to represent the engagement of the participants 115a-115d and the care givers 125a-125b in the activities.

In an embodiment of the present invention, one or more programs, executing, in one example on a computing resource 120a-120n, obtains a schedule of planned activities for the participants 115a-115d. The one or more programs may obtain this information from an electronic calendar, an electronic agreement, and/or an electronic service level agreement (SLA). These systems and/or documents may include information regarding the activities planned for a given individual as well as the service level expected (or paid for). For example, an SLA may specify that a (canine) participant in a grooming activity should receive a mini grooming service (which includes a bath, brushing, blow dry, nail trim, ear cleaning, sanitary trim, paw trim and body contour) or, a full groom (which include a bath, brushing, blow dry, nail trim, ear cleaning, sanitary trim, paw trim and full-body cut).

In an embodiment of the present invention, the one or more programs compare the scheduled activities with the completed activities (as determined utilizing data from the situational sensors 130a-130d), make a comparison, and determine the differences.

The one or more programs also utilize the data from emotional state sensors 110a-110d to analyze relationships and generate dependencies between the activities and the emotional states of the participants 115a-115d. These one or more programs effectively link the activities and emotional state sensor data, to determine the probability of emotional state changes and scope for any activity, based on historical trends. In an embodiment of the present invention, the one or more programs may utilize a machine learning algorithm to continually discover and tune these relationships and dependencies. In this manner, the one or more programs utilize this information to optimize the emotional state of a participant 115a-115d individual by changing parameters of an activity. As discussed above, by optimizing an activity, the one or more programs develop parameters for an activity that have a high probability of eliciting an emotional response from a participant 115a-115d that is within an acceptable pre-determined threshold.

In an embodiment of the present invention, the emotional state sensors 110a-110d may be integrated into a device that is carried on the participant 115a-115d or otherwise in contact with the participant 115a-115d. This type of emotional state sensor 110a-110d enables long-term monitoring of a participant, such that the one or more programs can determine the emotional state of a participant 115a-115d not only during an activity, but subsequent to an activity. Depending on the type of activity, the participant's emotional state during the activity, as well as the participant's emotional state during a timeframe after the activity, may be relevant to determining the overall impact of the activity on the emotional state. For example, in a situation where the activity is unpleasant, for example, the participant receives an injection from a care giver, the one or more programs determine the emotional state of the individual by monitoring the recovery of the emotional state of the participant 115a-115d, instead of or in addition to the sensor data that is contemporaneous with the activity.

Figure 2:
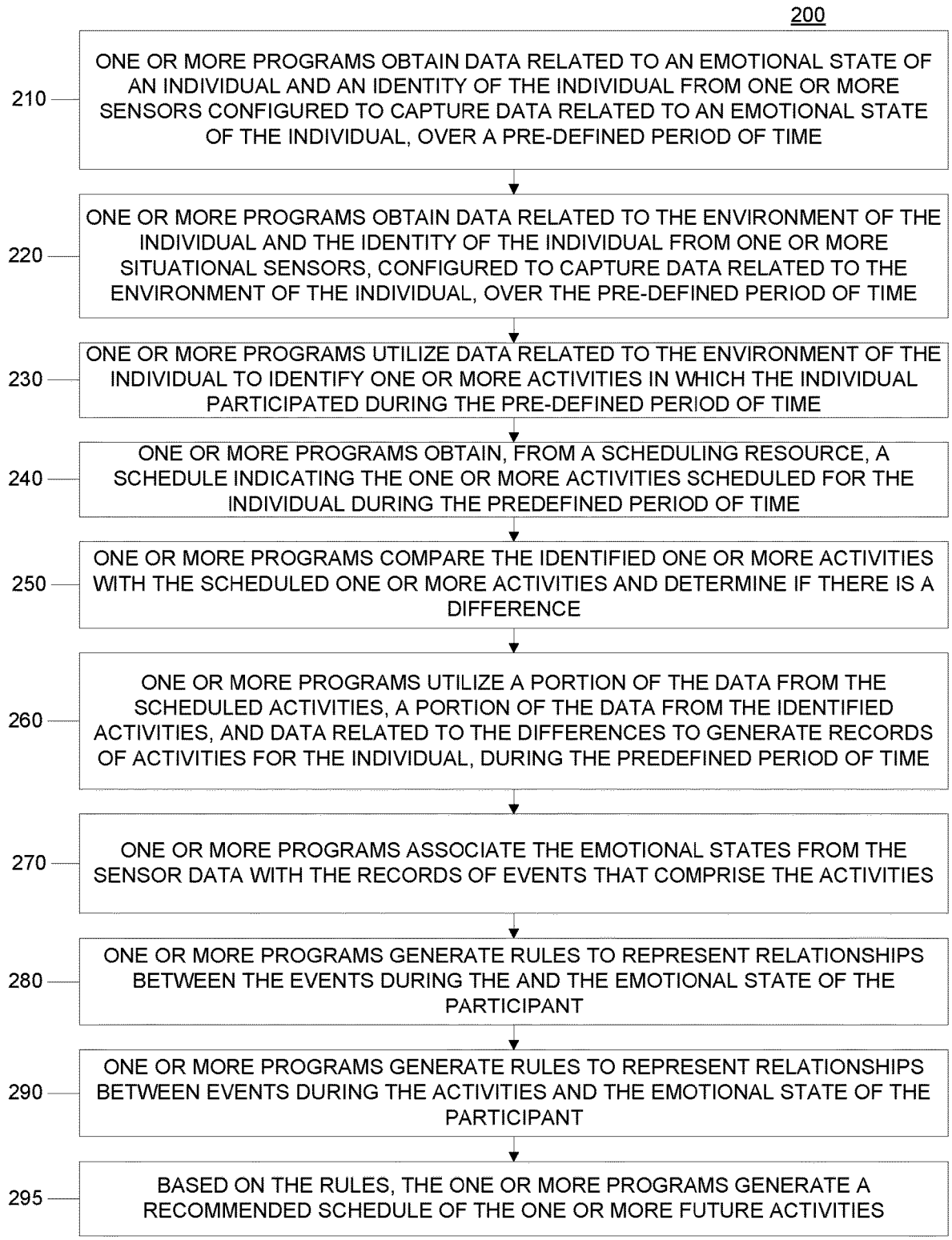
FIG. 2 is a workflow illustrating certain aspects of an embodiment of the present invention.

FIG. 2 is a workflow 200 of certain aspects of an embodiment of the present invention. For ease of understanding and illustrative purposes, references are made throughout the workflow 200 to elements of FIG. 1. In an embodiment of the present invention, one or more programs (e.g., executed on a processing resource of one or more computing resources 120a-120n, FIG. 1) obtain, via a wireless communications connection, such as the Internet, data related to an emotional state of an individual and the identity of the individual from one or more sensors 110a-110d (FIG. 1) configured to capture data related to an emotional state of the individual, over a pre-defined period of time (210). The one or more programs utilize the data from the emotional state sensors 110a-110d generate a range of emotional states for the participant. Based on the historical metrics, one or more programs calculate an upper bound, lower bound, mean, and standard deviation for a given individual, creating a baseline that the one or more programs can utilize to evaluate the emotional state of the individual at any given time.

In an embodiment of the present invention, the one or more programs obtain, via the wireless communications connection, data related to the environment of the individual and the identity of the individual from one or more situational sensors 130a-130d (FIG. 1), configured to capture data related to the environment of the individual, over the pre-defined period of time (220). In an embodiment of the present invention, the one or more programs utilize data related to the environment of the individual to identify one or more activities in which the individual participated, during the pre-defined period of time (230). Each activity may include various descriptive parameters, including, but not limited to, details about the activity, the duration of the activity, any sub-activities that comprise the activity, any participants other than the individual in the activity, and/the initiator of the activity.

In an embodiment of the present invention, the one or more programs obtain, from a scheduling resource (e.g., an electronic calendar, an electronic agreement, an electronic service level agreement (SLA), a scheduling database, etc.) a schedule indicating the one or more activities scheduled for the individual during the predefined period of time (240). The one or more programs compare the identified one or more activities with the scheduled one or more activities and determine if there is a difference (250). For example, an identified activity may last for a different duration than the scheduled activity indicated it was planned for. Also, the identified activity may indicate that the activity was led by one employee (of an activity provider) while the scheduled activity has indicated it would be led by a different employee. In an embodiment of the present invention, the program code may utilize any differences identified to report the compliance of the identified activities with the scheduled activities.

In an embodiment of the present invention, the one or more programs utilize a portion of the data from the scheduled activities, a portion of the data from the identified activities, and data related to the differences to generate records of activities for the individual during the predefined period of time (260). Provided that it does not conflict with the sensor data, the scheduling system from which the one or more programs obtains the scheduled activities may contain more detailed information about the activities which will assist the one or more programs is coordinating emotional state information with parameters of the activities in order to understand which parameters illicit which emotional responses.

FIG. 3 illustrates the difference between an identified activity 310 and a scheduled activity 320, in a predefined period of time. FIG. 3 also illustrates a record 330 of the activity, based on the identified activity 310 and the scheduled activity 320, and the differences between the two. By retaining accurate records of various activities, the one or more programs can accurately track emotional responses of individuals to particular activities over a period of time. The one or more programs accumulate historical records of the experiences of a given participant of a certain event and based on this data, the one or more programs can learn (e.g., utilizing a machine learning algorithm) how to configure that activity for the participant in a manner with a high probability of a known response. In an embodiment of the present invention, the one or more programs configure an event in order to elicit an emotional state that is within a given range of acceptability both based on the participant and based on the activity itself. As explained above, certain activities (e.g., receiving a massage) will elicit a more positive emotional state than other activities (e.g., receiving a shot). Thus, the target range for an emotional response can be relative based on the participant as well as based on the activity or activity type.

Returning to FIG. 2, based on generating records of activities for the individual during the predefined period of time, the one or more programs associate the emotional states from the sensor data with the records, for example, based on parameters, including timestamps, of the various events that comprise the activities (270). For example, the sensor data for a given outdoor activity may indicate a change in emotional state that is contemporaneous with environmental sensor data in the record indicating that it started to rain. Based on these associations, the one or more programs generate rules to represent relationships between events during the activities and the emotional state of the participant (280). In an embodiment of the present invention, the one or more programs continually create and update these rules.

Returning to FIG. 2, in an embodiment of the present invention, the one or more programs obtain one or more future activities (290). Based on the rules, the one or more programs generate a recommended schedule of the one or more future activities (295). For example, the one or more programs may configure the schedule of activities to produce an emotional state for the individual that is within a defined range of acceptability. In an embodiment of the present invention, the one or more programs produce all combinations of activities that can be offered, cognizant that some activities that occur at the same time cannot both be offered and recommend a schedule that produces the highest level of emotional state increase.

The program code may not optimize the emotional state of the participant to the highest possible value, but instead maintains a threshold of a certain level. In this embodiment, the program code generates permutations to generate the lowest cost of the offerings that meets the defined emotional state threshold, taking into account the cost associated with each of the one or more future activities.

In an embodiment of the present invention, the program code generates a schedule that includes the one or more future activities and also, in order to achieve a more positive emotional state, but may add other activities in order to achieve a target emotional state of the future activities are predicted not to achieve the goal. The one or more programs may determine that the one or more programs will lower the emotional state, and therefore, to achieve a target emotional state, more activities should be added to improve the emotional state of the individual. The one or more programs may also alert a user to activities that will not produce a target emotional state, regardless of the parameters employed.

In an embodiment of the present invention, the one or more programs monitor the emotional state of an individual for a period after the activity and utilize this data to generate a schedule that includes the one or more future activities. For example, if a requested activity does not produce a contemporaneous emotional state that is consistent with a desired threshold, but the activity is required, the one or more programs may analyze emotional sensor data obtained from the emotional state sensors 110*a*-110*d* for a period of time following the activity, and select a plan for the activity where the historical data indicates that the participant will return to a desired emotional state within a predetermined recovery period. This aspect is particularly useful when the activity is consistently recorded by the emotional state sensors 110*a*-110*d* as being unpleasant, but is a required activity, for example, for medical reasons.

Embodiments of the present invention include a computer-implemented method, a computer program product, and a system, where one or more programs, executing on at least one processing circuit, configure a first one or more sensors to capture data related to an emotional state of the individual. The one or more programs configure a second one or more sensors, to capture data related to an environment of the individual. The one or more programs obtain, over a pre-defined period of time, over a wireless communications connection, the data from the first one or more sensors and the data from the second one or more sensors, where the data from the first one or more sensors and the data from the second one or more sensors include an identity of the individual. The one or more programs utilize the data from the second one or more sensors to identify one or more activities in which the individual participated during the pre-defined period of time. The one or more programs obtain, from a scheduling resource, over the wireless communications connection, a schedule indicating the one or more activities scheduled for the individual during the predefined period of time. The one or more programs generate a record for each activity performed during the predefined period of time, based on comparing the identified one or more activities with the scheduled one or more activities, the identified one or more activities, and the scheduled one or more activities. The one or more programs determine, based on data from the first one or more sensors and the record for each activity, one or more emotional states of the individual throughout each activity of the identified activities. The one or more programs generate, based on the one or more emotional states of the individual throughout each activity of the identified activities, for each activity, a rule representing relationships between events during the activity and an emotional state of the participant. Based on the rules for the identified activities, the one or more programs generate a recommended schedule of one or more future activities, wherein the recommended schedule maintains a threshold emotional state for the individual.

In an embodiment of the present invention, the one or more programs also determine, based on the data from the first one or more sensors, the threshold emotional state for the individual, wherein the threshold defines a lowest acceptable emotional state and a highest acceptable emotional state, for the individual.

In an embodiment of the present invention, the one or more programs also generate, based on comparing the identified one or more activities with the scheduled one or more activities, by the one or more processors, a report comprising differences between the identified one or more activities and the scheduled one or more activities.

In an embodiment of the present invention, the one or more programs monitor the data from the first one or more sensors, the data the second one or more sensors, and a scheduling resource. The one or more programs update the rules for the identified activities, based on the monitoring.

In an embodiment of the present invention, the one or more programs additionally obtain a request to schedule a new activity, wherein the request comprises parameters defining events within the new activity. The one or more programs analyze the request to determine if the request satisfies the threshold emotional state. Based on determining that the request does not satisfy the threshold, the one or more programs update the parameters of the events, based on the rules, to generate an updated request. The one or more programs update the recommended schedule with the new activity, as defined by the updated request.

In an embodiment of the present invention, the rules include a machine learning algorithm.

In an embodiment of the present invention, to generate a recommended schedule of one or more future activities, the one or more programs obtain a request to schedule the one or more future activities. The one or more programs apply the rules to determine if the one or more future activities can be scheduled to maintain a threshold emotional state for the individual. The one or more programs determine that at least one activity of the one or more future activities cannot be scheduled to maintain the threshold and generate the recommended schedule with a correction to the at least one activity. In one aspect this correction can be selected from a group consisting of: the one or more programs excluding the at least one activity from the recommended schedule, the one or more programs adding a new activity to the recommended schedule to elevate the emotional state of the individual before the at least one activity, and the one or more programs changing a portion of the at least one activity. In an embodiment of the present invention, the one or more programs may also monitor, via the first one or more sensors, data related to an emotional state of the individual for a second predefined period of time following the at least one activity. The one or more programs determine, based on the data related to the emotional state of the individual for the second predefined period of time following the at least one activity, configuration parameters for the at least one activity that maintain the threshold based on the emotional state of the individual during the predefined time period. In this embodiment the correction may include the one or more programs integrating the at least one activity into the schedule based on the configuration parameters.

In an embodiment of the present invention, when the one or more programs generate a recommended schedule of one or more future activities, the one or more programs automatically update the scheduling resource with the recommended schedule.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing resource(s) 120 (FIG. 1), can be understood as cloud computing node 10 (FIG. 4) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
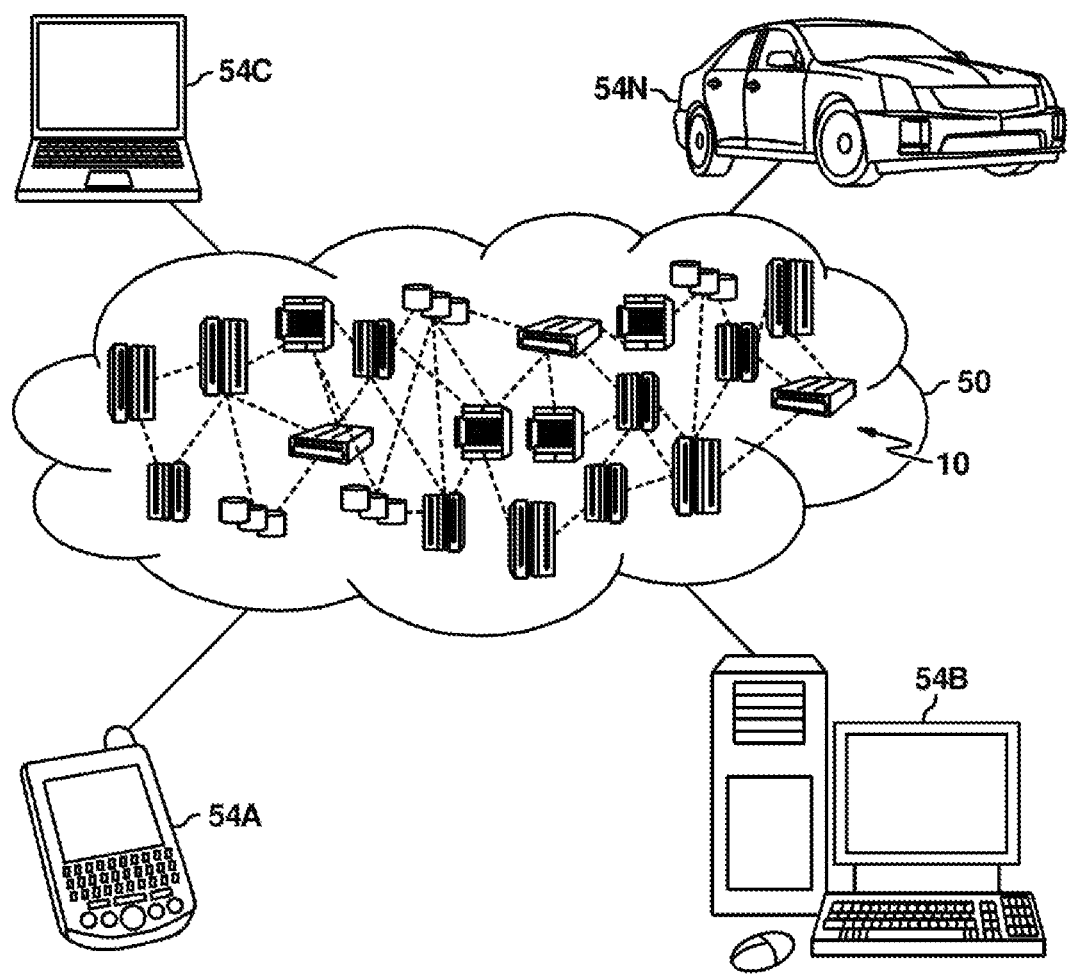
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
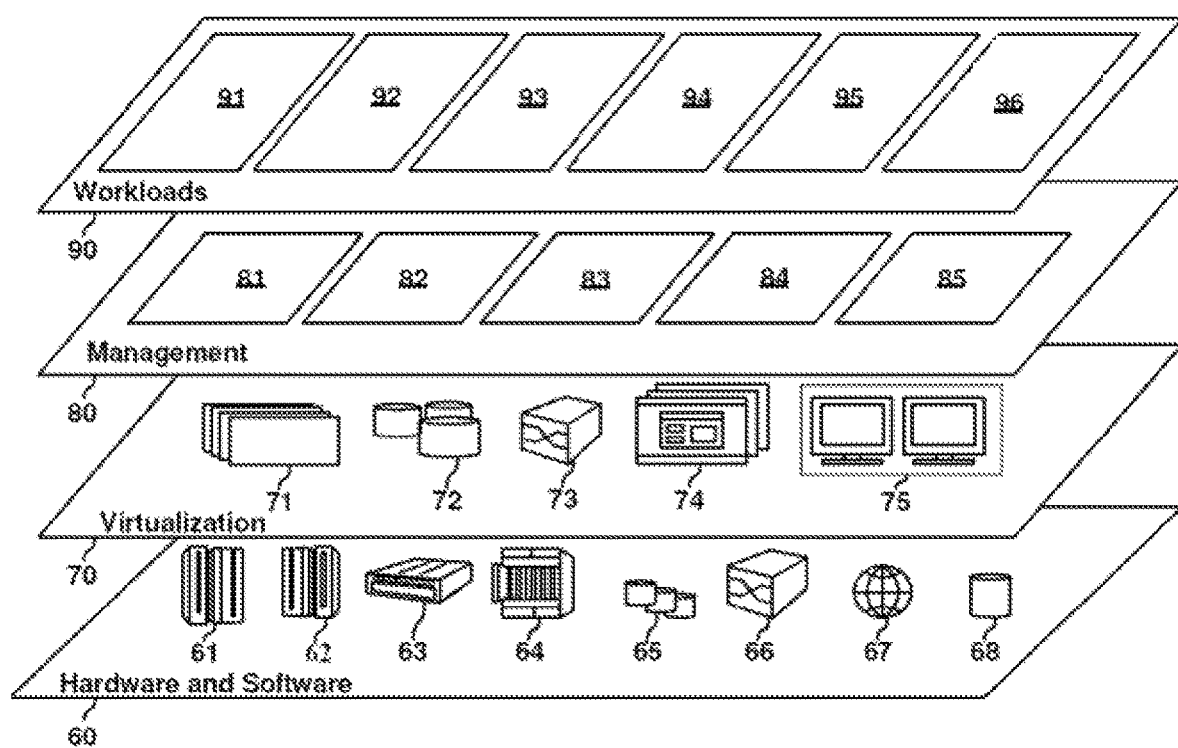
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating an optimized schedule 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    configuring, by one or more processors, a first one or more sensors, to capture data related to an emotional state of the individual, wherein each sensor of the first one or more sensors is in physical contact with the individual or within a vicinity of the individual, wherein the first one or more sensors are active sensors, and wherein the first one or more sensors are Internet of Things devices;
    configuring, by one or more processors, a second one or more sensors, to capture data related to an environment of the individual, wherein the second one or more sensors are situational sensors which determine environmental conditions within a given ranges of the second one or more sensors, and wherein the environmental conditions are selected from the group consisting of: temperature, humidity, vibrations, motion, light, pressure, and noise;
    obtaining, by the one or more processors, over a predefined period of time, over a wireless communications connection, the data from the first one or more sensors and the data from the second one or more sensors, wherein the data from the first one or more sensors and the data from the second one or more sensors comprise an identity of the individual;
    utilizing, by the one or more processors, the data from the second one or more sensors to identify one or more activities in which the individual participated during the pre-defined period of time;
    obtaining, by the one or more processors, from a scheduling resource, over the wireless communications connection, a schedule indicating the one or more activities scheduled for the individual during the predefined period of time;
    generating, by the one or more processors, a record for each activity performed during the predefined period of time, based on comparing the identified one or more activities with the scheduled one or more activities, the identified one or more activities, and the scheduled one or more activities;
    determining, by the one or more processors, based on data from the first one or more sensors and the record for each activity, one or more emotional states of the individual throughout each activity of the identified activities, wherein the determining for each activity is based on data collected by the first one or more sensors contemporaneously with each activity and on data collected by the first one or more sensors continuously during a pre-defined interval after each activity, wherein the data collected by the first one or more sensors during the pre-defined interval after each activity indicates timing for a recovery of the individual to a baseline emotional state subsequent to each activity;
    generating, by the one or more processors, based on the one or more emotional states of the individual throughout each activity of the identified activities, for each activity, a rule representing relationships between events during the activity and an emotional state of the participant;
    based on the rules for the identified activities, generating, by the one or more processors, a recommended schedule of one or more future activities, wherein the recommended schedule maintains a threshold emotional state for the individual, wherein the threshold defines a lowest acceptable emotional state and a highest acceptable emotional state, for the individual;
    monitoring, by the one or more processors, the data from the first one or more sensors, the data the second one or more sensors, and data from a scheduling resource, wherein the monitoring of the data from the first one or more sensors comprises data collected by the first one or more sensors contemporaneously with each activity and on data collected by the first one or more sensors during the pre-defined interval after each activity, wherein the data collected by the first one or more sensors during the pre-defined interval after each activity indicates timing for the recovery of the individual to the baseline emotional state subsequent to each activity; and automatically updating, by the one or more processors, the rules for the identified activities, based on the data from the first one or more sensors, the data the second one or more sensors, and the data from the scheduling resource obtained during the monitoring.

2. The computer-implemented method of claim 1, further comprising:
  determining, based on the data from the first one or more sensors, the threshold emotional state for the individual.

3. The computer-implemented method of claim 1, further comprising:
  generating, based on comparing the identified one or more activities with the scheduled one or more activities, by the one or more processors, a report comprising differences between the identified one or more activities and the scheduled one or more activities.

4. The computer-implemented method of claim 1, further comprising:
  obtaining, by the one or more processors, a request to schedule a new activity, wherein the request comprises parameters defining events within the new activity;
  analyzing, by the one or more processors, the request to determine if the request satisfies the threshold emotional state;
  based on determining that the request does not satisfy the threshold, updating, by the one or more processors, the parameters of the events, based on the rules, to generate an updated request; and
  updating, by the one or more processors, the recommended schedule with the new activity, as defined by the updated request.

5. The computer-implemented method of claim 1, wherein the rules comprise a machine learning algorithm.

6. The computer-implemented method of claim 1, wherein generating a recommended schedule of one or more future activities, further comprises:
  obtaining, by the one or more processors, a request to schedule the one or more future activities;
  applying, by the one or more processors, the rules, to determine if the one or more future activities can be scheduled to maintain a threshold emotional state for the individual;
  determining, by the one or more processors, that at least one activity of the one or more future activities cannot be scheduled to maintain the threshold; and
  generating, by the one or more processors, the recommended schedule with a correction to the at least one activity.

7. The computer-implemented method of claim 6, wherein the correction is selected from a group consisting of: excluding the at least one activity from the recommended schedule, adding a new activity to the recommended schedule to elevate the emotional state of the individual before the at least one activity, and changing a portion of the at least one activity.

8. The computer-implemented method of claim 6, further comprising:
  monitoring, by the one or more processors, via the first one or more sensors, data related to an emotional state of the individual for a second predefined period of time following the at least one activity; and
  determining, by the one or more processors, based on the data related to the emotional state of the individual for the predefined period of time following the at least one activity, configuration parameters for the at least one activity that maintain the threshold based on the emotional state of the individual during the second predefined time period, and wherein the correction comprises:
    integrating, by the one or more processors, the at least one activity into the schedule based on the configuration parameters.

9. The computer-implemented method of claim 1, wherein generating a recommended schedule of one or more future activities, further comprises:
  automatically updating, by the one or more processors, the scheduling resource with the recommended schedule.

10. The computer-implemented method of claim 1, wherein each activity is selected from the group consisting of: receiving a service and participating in a program.

11. A computer program product comprising:
  a computer readable storage medium readable by one or more processors and storing instructions for execution by the one or more processors for performing a method comprising:
    configuring, by the one or more processors, a first one or more sensors, to capture data related to an emotional state of the individual, wherein each sensor of the first one or more sensors is in physical contact with the individual or within a vicinity of the individual, wherein the first one or more sensors are active sensors, and wherein the first one or more sensors are Internet of Things devices;
    configuring, by one or more processors, a second one or more sensors, to capture data related to an environment of the individual, wherein the second one or more sensors are situational sensors which determine environmental conditions within a given ranges of the second one or more sensors, and wherein the environmental conditions are selected from the group consisting of: temperature, humidity, vibrations, motion, light, pressure, and noise;
    obtaining, by the one or more processors, over a pre-defined period of time, over a wireless communications connection, the data from the first one or more sensors and the data from the second one or more sensors, wherein the data from the first one or more sensors and the data from the second one or more sensors comprise an identity of the individual;
    utilizing, by the one or more processors, the data from the second one or more sensors to identify one or more activities in which the individual participated during the pre-defined period of time;
    obtaining, by the one or more processors, from a scheduling resource, over the wireless communications connection, a schedule indicating the one or more activities scheduled for the individual during the predefined period of time;
    generating, by the one or more processors, a record for each activity performed during the predefined period of time, based on comparing the identified one or more activities with the scheduled one or more activities, the identified one or more activities, and the scheduled one or more activities;
    determining, by the one or more processors, based on data from the first one or more sensors and the record for each activity, one or more emotional states of the individual throughout each activity of the identified activities, wherein the determining for each activity is based on data collected by the first one or more sensors contemporaneously with each activity and on data collected by the first one or more sensors continuously during a pre-defined interval after each activity, wherein the data collected by the first one or more sensors during the pre-defined interval after each activity indicates timing for a recovery of the individual to a baseline emotional state subsequent to each activity;

generating, by the one or more processors, based on the one or more emotional states of the individual throughout each activity of the identified activities, for each activity, a rule representing relationships between events during the activity and an emotional state of the participant;

based on the rules for the identified activities, generating, by the one or more processors, a recommended schedule of one or more future activities, wherein the recommended schedule maintains a threshold emotional state for the individual, wherein the threshold defines a lowest acceptable emotional state and a highest acceptable emotional state, for the individual;

monitoring, by the one or more processors, the data from the first one or more sensors, the data the second one or more sensors, and data from a scheduling resource, wherein the monitoring of the data from the first one or more sensors comprises data collected by the first one or more sensors contemporaneously with each activity and on data collected by the first one or more sensors during the pre-defined interval after each activity, wherein the data collected by the first one or more sensors during the pre-defined interval after each activity indicates timing for the recovery of the individual to the baseline emotional state subsequent to each activity; and automatically updating, by the one or more processors, the rules for the identified activities, based on the data from the first one or more sensors, the data the second one or more sensors, and the data from the scheduling resource obtained during the monitoring.

12. The computer program product of claim 11, the method further comprising:
determining, based on the data from the first one or more sensors, the threshold emotional state for the individual.

13. The computer program product of claim 11, the method further comprising:
generating, based on comparing the identified one or more activities with the scheduled one or more activities, by the one or more processors, a report comprising differences between the identified one or more activities and the scheduled one or more activities.

14. The computer program product of claim 11, the method further comprising:
obtaining, by the one or more processors, a request to schedule a new activity, wherein the request comprises parameters defining events within the new activity;
analyzing, by the one or more processors, the request to determine if the request satisfies the threshold emotional state;
based on determining that the request does not satisfy the threshold, updating, by the one or more processors, the parameters of the events, based on the rules, to generate an updated request; and
updating, by the one or more processors, the recommended schedule with the new activity, as defined by the updated request.

15. The computer program product of claim 11, wherein the rules comprise a machine learning algorithm.

16. The computer program product of claim 11, wherein generating a recommended schedule of one or more future activities, further comprises:
obtaining, by the one or more processors, a request to schedule the one or more future activities;
applying, by the one or more processors, the rules, to determine if the one or more future activities can be scheduled to maintain a threshold emotional state for the individual;
determining, by the one or more processors, that at least one activity of the one or more future activities cannot be scheduled to maintain the threshold; and
generating, by the one or more processors, the recommended schedule with a correction to the at least one activity.

17. The computer program product of claim 16, wherein the correction is selected from a group consisting of: excluding the at least one activity from the recommended schedule, adding a new activity to the recommended schedule to elevate the emotional state of the individual before the at least one activity, and changing a portion of the at least one activity.

18. The computer program product of claim 11, wherein generating a recommended schedule of one or more future activities, further comprises:
automatically updating, by the one or more processors, the scheduling resource with the recommended schedule.

19. A system comprising:
a memory;
one or more processors in communication with the memory;
a first one or more sensors and a second one or more sensors in communication with the one or more processors over a wireless communications connection; and
program instructions executable by the one or more processors via the memory to perform a method, the method comprising:
configuring, by the one or more processors, a first one or more sensors, to capture data related to an emotional state of the individual, wherein each sensor of the first one or more sensors is in physical contact with the individual or within a vicinity of the individual, wherein the first one or more sensors are active sensors, and wherein the first one or more sensors are Internet of Things devices;
configuring, by one or more processors, a second one or more sensors, to capture data related to an environment of the individual, wherein the second one or more sensors are situational sensors which determine environmental conditions within a given ranges of the second one or more sensors, and wherein the environmental conditions are selected from the group consisting of: temperature, humidity, vibrations, motion, light, pressure, and noise;
obtaining, by the one or more processors, over a pre-defined period of time, over a wireless communications connection, the data from the first one or more sensors and the data from the second one or more sensors, wherein the data from the first one or more sensors and the data from the second one or more sensors comprise an identity of the individual;
utilizing, by the one or more processors, the data from the second one or more sensors to identify one or more activities in which the individual participated during the pre-defined period of time;

obtaining, by the one or more processors, from a scheduling resource, over the wireless communications connection, a schedule indicating the one or more activities scheduled for the individual during the predefined period of time;

generating, by the one or more processors, a record for each activity performed during the predefined period of time, based on comparing the identified one or more activities with the scheduled one or more activities, the identified one or more activities, and the scheduled one or more activities;

determining, by the one or more processors, based on data from the first one or more sensors and the record for each activity, one or more emotional states of the individual throughout each activity of the identified activities, wherein the determining for each activity is based on data collected by the first one or more sensors contemporaneously with each activity and on data collected by the first one or more sensors continuously during a pre-defined interval after each activity, wherein the data collected by the first one or more sensors during the pre-defined interval after each activity indicates timing for a recovery of the individual to a baseline emotional state subsequent to each activity;

generating, by the one or more processors, based on the one or more emotional states of the individual throughout each activity of the identified activities, for each activity, a rule representing relationships between events during the activity and an emotional state of the participant;

based on the rules for the identified activities, generating, by the one or more processors, a recommended schedule of one or more future activities, wherein the recommended schedule maintains a threshold emotional state for the individual, wherein the threshold defines a lowest acceptable emotional state and a highest acceptable emotional state, for the individual;

monitoring, by the one or more processors, the data from the first one or more sensors, the data the second one or more sensors, and data from a scheduling resource, wherein the monitoring of the data from the first one or more sensors comprises data collected by the first one or more sensors contemporaneously with each activity and on data collected by the first one or more sensors during the pre-defined interval after each activity, wherein the data collected by the first one or more sensors during the pre-defined interval after each activity indicates timing for the recovery of the individual to the baseline emotional state subsequent to each activity; and automatically updating, by the one or more processors, the rules for the identified activities, based on the data from the first one or more sensors, the data the second one or more sensors, and the data from the scheduling resource obtained during the monitoring.

\* \* \* \* \*